United States Patent [19]

Ikemori

[11] Patent Number: 4,836,661
[45] Date of Patent: Jun. 6, 1989

[54] OPTICAL SYSTEM OF VARIABLE MAGNIFICATION POWER

[75] Inventor: Keiji Ikemori, Kanagawa, Japan

[73] Assignee: Canon Kabushiki Kaisha, Tokyo, Japan

[21] Appl. No.: 556,705

[22] Filed: Nov. 30, 1983

[30] Foreign Application Priority Data

Dec. 1, 1982 [JP] Japan .............................. 57-210909
Dec. 24, 1982 [JP] Japan .............................. 57-230448
Dec. 24, 1982 [JP] Japan .............................. 57-230449
Dec. 24, 1982 [JP] Japan .............................. 57-230450

[51] Int. Cl.$^4$ .......................... G02B 15/14; G02B 1/06
[52] U.S. Cl. .................................. 350/423; 350/419; 350/427
[58] Field of Search ................ 350/418, 419, 423, 427

[56] References Cited

U.S. PATENT DOCUMENTS

| | | | |
|---|---|---|---|
| 3,415,592 | 12/1968 | Price | 350/423 |
| 4,407,567 | 10/1983 | Michelet et al. | 350/423 |
| 4,444,471 | 4/1984 | Ford et al. | 350/419 X |
| 4,514,048 | 4/1985 | Rogers | 350/423 |

OTHER PUBLICATIONS

Caudell et al; "Active Optics with Room Temperature Vulcanizing Silicone Rubber"; *SPIE;* vol. 115; Advances in Replicated & Plastic Optics; pp. 18–24.

*Primary Examiner*—John K. Corbin
*Assistant Examiner*—Scott J. Sugarman
*Attorney, Agent, or Firm*—Toren, McGeady & Associates

[57] ABSTRACT

In the disclosed optical system of variable magnification power, at least one component A of two components A and B has its refractive power varied so that the focal length of the entire system can be continuously varied throughout a range while maintaining the position of the image plane constant throughout the range.

27 Claims, 2 Drawing Sheets

OPTICAL SYSTEM OF VARIABLE MAGNIFICATION POWER

BACKGROUND OF THE INVENTION

1. Field of the Invention

This invention relates to optical systems of variable magnification power and more particularly to an optical system of which the focal length is varied by varying the refractive power of at least one lens component.

2. Description of the Prior Art

In prior art variable-magnification optical systems, continuously varying the focal length of the entire system throughout a range while maintaining the position of the image plane constant required axially moving at least two lens components to effect zooming. During zooming these two lens components always have to be separated from each other by a given amount to avoid mechanical interference between them. This necessarily put a restriction on the requirement of minimizing the bulk and size of the lens system. To accomplish the latter end, at least one of the zoom components had to be moved non-linearly. Because of this, a smooth zooming operation was difficult to achieve. Attempts have been made to realize a compact wide-range zoom lens system by using three or more zoom components axially movable in different relations to one another. To hold these components and to make sure these components are smoothly movable, however, the mechanical mounting therefor had to be constructed in a very complicated form. Therefore, the use of three or more zoom components in a single zoom lens system could not be said to be a good solution.

There have been proposals for continuously varying the refractive power (focal length) of a component by varying the radius of curvature of its lens surface or by varying the refractive index of the material from which the component is made, as, for example, disclosed in Japanese Laid-open patent applications Nos. SHO 55-36857, 56-64209, 56-62201, 56,92501, 56-101101 and 56-140303. Also known as an example of application of the refractive power-variable lens to optical systems is Japanese Laid-Open patent application No. SHO 54-146648.

SUMMARY OF THE INVENTION

The present invention is to achieve the possibility of varying the focal length of an optical system continuously throughout a range without the necessity of axially moving any of the components thereof, or with allowance of one component to slightly move. Its object is to provide an optical system of variable magnification power in a compact form while still permitting construction of a mechanical mounting for the system in a simple form.

To achieve this, a feature of the optical system of variable magnification power which is characteristic of the present invention is that as at least two components A and B are used, the refractive power of at least one of the two components, say, component A, is made to vary continuously whereby the focal length of the entire system can be varied throughout a range. And for the position of the image plane of the entire system is maintained constant throughout the range, two ways may be selectively employed in one of which either the component A or the component B is made to slightly move, and in the other of which the component B while being left stationary is made to vary its refractive power.

Conversely when the component A of variable refractive power is selected for employment in maintaining the constant position of the image plane, the focal length varying provision is made either by moving at least one of the component A and the component B of fixed refractive power, or by holding the component B stationary and varying its refractive power.

BRIEF DESCRIPTION OF THE DRAWINGS

FIGS. 1(B), 2(B), 3(B), 4(B), 5(B) and 6(B) are diagrams showing the refractive power distributions of the lenses shown in FIGS. 1, 3, 4, 5 and 6.

DETAILED DESCRIPTION OF THE PREFERRED EMBODIMENTS

The present invention is described in connection with a first embodiment thereof where the optical system of variable magnification power has at least two lens components of variable refractive power and the focal length of the entire system can be varied while maintaining the position of the image plane of the entire system constant.

Figure 1A:
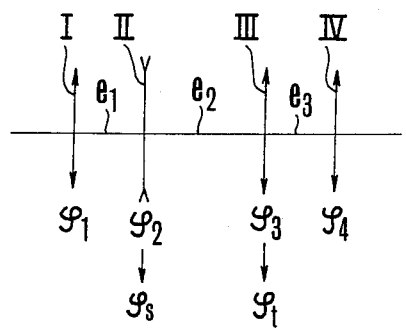
FIGS. 1(A) and 2 are schematic diagrams of embodiments of optical systems of variable magnification power according to the present invention respectively.

For the purpose of clarity, as illustrated in FIG. 1(A), the optical system with variable magnification power is constructed with four lens components whose first three I, II and III (counting from the front) are assumed to constitute an afocal system. The refractive powers of the lens components I to IV in an initial state are taken at respective values $\phi_1$, $\phi_2$ $\phi_3$ and $\phi_4$, and the intervals between the principal points of the successive two lens components at values e1, e2 and e3. Assuming that the refractive power of the second component II varies from $\phi_2$ to $\phi_s$, then the required value $\phi_t$ of the refractive power of the third lens component III for compensating for the shift of the image plane from the initial position is found by the following equation $$\phi_t = -(A)/H - e2.A$$

where $$H = 1 - e1.\phi_1, \quad A = \phi_1 + H.\phi_s$$

Figure 1B:
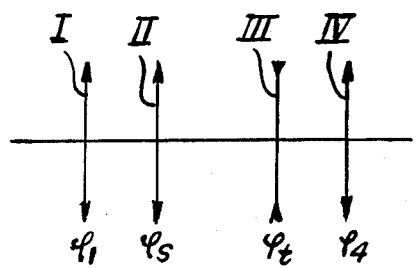

By varying the refractive power $\phi_t$ of the third lens component III in accordance with the above-defined function of the refractive power $\phi_s$ of the second lens component II, therefore, an optical system of the zoom type can be obtained. This is illustrated in FIG. 1(B).

A practical example of such optical system with numerical data for the power distribution over all the lens components in the wide angle position as the start point follows:

| | |
|---|---|
| $\phi_1 = 0.009091$ | e1 = 9.5 |
| $\phi_2 = -0.028571$ | e2 = 42 |
| $\phi_3 = 0.010449$ | e3 = 15 |

-continued $$\phi 4 = 0.008774$$

Here upon variation of the refractive power of the second lens component II from the above given value $\phi 2$ to 0.005, calculating the required values of the refractive power of the third lens component III based on the above-defined formula, we have the following result:

TABLE 1

(Numerical Example 1)

| Overall Focal Length | $\phi s$ | $\phi t$ |
|---|---|---|
| 70 | −0.028571 | 0.010449 |
| 73.930 | −0.026316 | 0.009699 |
| 82.318 | −0.022222 | 0.008098 |
| 97.299 | −0.016667 | 0.005239 |
| 112.680 | −0.0125 | 0.002303 |
| 124.486 | −0.01 | 0.000050 |
| 157.490 | −0.005 | −0.006250 |
| 214.308 | 0 | −0.017094 |
| 335.259 | 0.005 | −0.040179 |

Thus, the use of the second lens component of variable refractive power from −0.028571 to 0.005 along with the third lens component of variable refractive power from 0.010449 to −0.040179 provides an optical system of variable magnification power in an overall focal length range from 70 mm to 335.259 mm while maintaining constant the position of the image plane.

It will be appreciated that while the prior art resided in moving at least two lens components along a common optical axis to vary the focal length of the entire system, the present invention has achieved the possibility of realizing an optical system of variable magnification power without involving any axial movement of the zoom control components.

Though the foregoing embodiment has been described in connection with the four-component optical system of variable magnification power, the principles of the present invention are applicable to any type of zoom lens system provided that there are two lens components to which independent respective variations of refractive power can be imparted. In case the optical system has three or more components, more than two components may be used as the refractive power variable component, and still accomplish the object of the present invention can be accomplished likewise. As the increased number of components are allowed to contribute to an equivalent magnification range, a lessened duty of varying the refractive power may be laid on each component with the advantage of reducing the stress on the operating mechanism for the refractive power variable components. Also, since the degree of flexibility of lens design is increased to permit variation of the refractive power of each component from a positive to a negative value, or vice versa, a valuable increase in the magnification range can be advantageously achieved.

In another embodiment of the present invention the optical system of variable magnification power has at least two lens components, one of which is of variable refractive power and functions as either the variator or the compensator, and the other of which is of fixed refractive power and is made axially movable to function as the compensator, or the variator respectively. For example, two lens components A and B constitute an optical system of variable magnification power. The lens component A is arranged to remain stationary and the refractive power of the lens component A is made variable so the focal length of the entire system can be continuously varied in a magnification range, and the lens component B is made axially movable so the image plane of the entire system is maintained at the constant position. A converse example may be utilized in which the lens component A is used in maintaining the position of the image plane constant, and the lens component B is used in varying the magnification.

Figure 2:
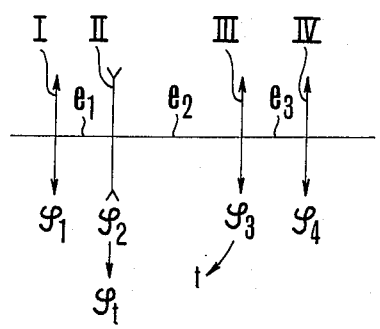

Next, for the purpose of clarity, a more detailed explanation follows concerning an example of a zoom lens system having four components shown in FIG. 2. The four components are taken, from front to rear, as a first, a second, a third and a fourth component having refractive powers, $\phi 1$, $\phi 2$, $\phi 3$ and $\phi 4$ respectively with their principal points in respective intervals e1, e2 and e3. The first to the third components are assumed to constitute an afocal system. Here when the refractive power of the second component is changed to $\phi t$, the required axial movement, t, of the third component for maintaining the position of the image plane constant can be found by the following equation:

$$t = (1)/\phi 3 - e2 + (H)/A$$

where $H = 1 - e1 \cdot \phi 1$, $A = \phi 1 + H \cdot \phi t$, t has the positive sign when it moves rearward.

A practical example of such an optical system is next presented with the following numerical data for the power distribution in an initial state.

| | |
|---|---|
| $\phi 1 = 0.009091$ | e1 = 9.5 |
| $\phi 2 = -0.028571$ | e2 = 42 |
| $\phi 3 = 0.010449$ | e3 = 15 |
| $\phi 4 = 0.008774$ | |

Here for a given range of variation of the refractive power $\phi 2$ from the above value to −0.02, we have the required values of movement, t, of the third component calculated based on the above-defined formula and listed in Table 2 for the numerical data of that specific example.

TABLE 2

(Numerical Example 2)

| Overall Focal Length | $\phi t$ | t |
|---|---|---|
| 70 | −0.028571 | 0 |
| 79.648 | −0.026316 | −7.402 |
| 97.965 | −0.023256 | −21.454 |
| 119.771 | −0.020833 | −38.183 |
| 129.704 | −0.02 | −45.804 |

As is obvious from Table 2, the use of the second component of variable refractive power $\phi 2$ from −0.028571 to −0.02 in combination with the arrangement of the third lens component to move forward by 45.804 mm provides an optical system of variable magnification power in an overall focal length range from 70 to 129.704 mm while maintaining the position of the image plane constant.

Thus, while the prior art optical system of variable magnification power necessitates at least two axially movable components for varying the focal length of the entire system, the present invention makes it possible for only one axially movable component to suffice for realizing an optical system of variable magnification power.

Another example of the second embodiment is an optical system of variable magnification power having at least two lens components A and B. Here, the component A is moved axially to effect continuous variation of the focal length of the entire system and the component B is made to vary its refractive power continuously so the position of the image plane can be maintained constant.

For the purpose of clarity, the number of lens components constituting an optical system of such construction and arrangement is taken at two, which are, from front to rear, a first component having a variable refractive power $\phi 1$ and a second component having a fixed refractive power $\phi 2$ with their principal points in an interval E. Here when the second component moves a distance, t, an equation for the required value of refractive power $\phi t$ of the first component to compensate for the image shift can be written as follows:

$$t = (a)/(E+t) - (SK-t)$$

where $$a = (SK-t)\phi 2 - 1$$

$$SK = (1 - E\phi 1)/\phi 1 + (1 - E\phi 1)\phi 2$$

$\phi 1$ is the value of refractive power of the first component in an initial state, and
t has a positive sign when it moves toward the rear.

For a given power distribution over the optical system in an initial state at $\phi 1 = -1/50$, $\phi 2 = 1/35$ and $E = 35$, calculating the just above defined equation under the condition that the second component moves forward, and the resultant values of the focal length of the entire system, we obtain numerical data of a specific example 3 in Table 3 below.

TABLE 3

| (Numerical Example 3) | | | |
|---|---|---|---|
| Overall Focal Length | t | E | $\phi t$ |
| 35 | 0 | 35 | −0.02 |
| 39.214 | −5 | 30 | −0.0214936 |
| 44.857 | −10 | 25 | −0.0219745 |
| 51.929 | −15 | 20 | −0.0217331 |
| 60.429 | −20 | 15 | −0.0210401 |
| 70.357 | −25 | 10 | −0.0201014 |

Figure 3:
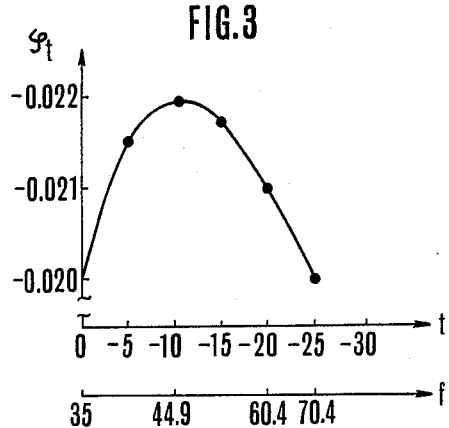
FIGS. 3, 4, 5 and 6 are graphs illustrating variations of the focal lengths of different specific optical systems numerically exemplified 3, 4, 5 and 6 respectively as respective different functions of variation of the refractive power of one component and of movement of another component.
Figure 3B:
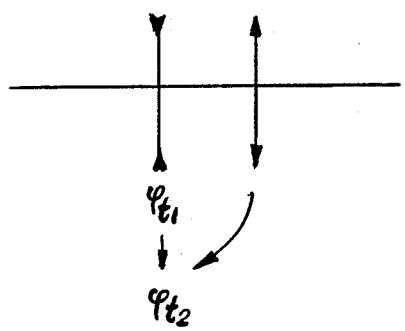

As is obvious from Table 3, FIG. 3(B) illustrates the refractive power distribution of the lens in FIG. 3 the use of the second component axially movable in a range of 25 mm in combination with the first component of variable refractive power provides realization of an optical system of variable magnification power in a focal length range from 35 mm to 70.357 mm, while maintaining the position of the image plane constant.

The numerical data of Table 3 for Example 3 are plotted in coordinates with a focal length scale in FIG. 3.

Next described is another example of the optical system which has four components, or, from front to rear, a first, a second, a third and a fourth components having refractive powers $\phi 1$, $\phi 2$, $\phi 3$ and $\phi 4$ respectively with their principal points at respective intervals E1, E2 and E3.

Here under the condition that the second component as the variator moves a distance t, we find an equation for the required value of refractive power $\phi t$ of the third component expressed as:

$$\phi t = (1)/SK - (A3)/H3$$

where $$SK = \frac{1 - E1 \cdot \phi 1 - E2 \cdot \{\phi 1 + (1 - E1 \cdot \phi 1)\phi 2\}}{\phi 1 + (1 - E1 \cdot \phi 1)\phi 2 + [1 - E1 \cdot \phi 1 - E2\{\phi 1 + (1 - E1 \cdot \phi 1)\phi 2\}]\phi 3}$$

$$A3 = \phi 1 + \{1 - (E1 + t)\phi 1\}\phi 2$$

$$H3 = 1 - (E1 + t) - (E2 - t)A3$$

For a given power distribution over such an optical system in an initial state at $\phi 1 = 1/110$, $\phi 2 = -1/35$, $\phi 3 = 1/95.702$, $\phi 4 = 1/113.973$, $E1 = 9.5$, $E2 = 42$ and $E3 = 10$, under the condition that the second component moves a distance, t, rearwardly, this equation gives numerical data for the variable refractive power $\phi t$ of the third component listed in Table 4 as a specific example 4 where the respective values of the focal length of the entire system are also shown.

TABLE 4

| (numerical Example 4) | | | | |
|---|---|---|---|---|
| Overall Focal Length | t | E1 | E2 | $\phi t$ |
| 70 | 0 | 9.5 | 42 | 0.01045 |
| 78.623 | 5 | 14.5 | 37 | 0.01084 |
| 88.762 | 10 | 19.5 | 32 | 0.01123 |
| 100.733 | 15 | 24.5 | 27 | 0.01159 |
| 114.913 | 20 | 29.5 | 22 | 0.01192 |
| 131.731 | 25 | 34.5 | 17 | 0.01216 |
| 151.649 | 30 | 39.5 | 12 | 0.01227 |
| 175.098 | 35 | 44.5 | 7 | 0.01217 |
| 202.350 | 40 | 49.5 | 2 | 0.01176 |

As is obvious from Table 4, the use of the second component axially movable in a range of 40 mm in combination with the third component of continuously variable refractive power provides realization of a zoom lens system of a range from 70 to 202.893 mm while maintaining constant the position of the image plane.

Figure 4:
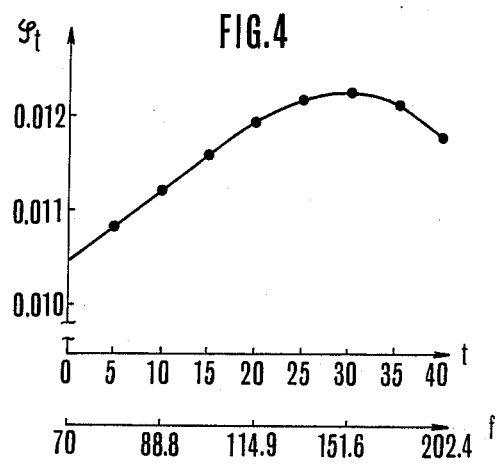
Figure 4B:
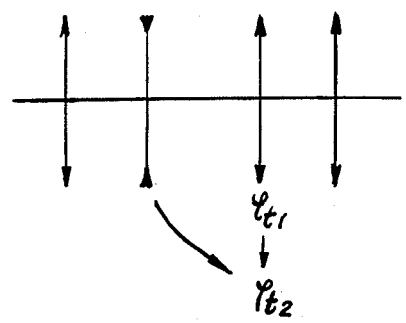

The numerical data of Table 4 in accordance with which the specific example is constructed are plotted in coordinates in FIG. 4. FIG. 4(B) illustrates the refractive power distribution of the lens in FIG. 4.

It is in the foregoing embodiment of the invention that to render the required variation of the refractive power of the component as the variator or compensator for effecting an equivalent result as short as possible is rather preferable from the standpoint of, for example, easy control of the radius of curvature of the lens surface or the refractive index of the interior material. For this reason, the range of variation of the refractive power of that component should be chosen not by a simple spirit and scope, but so as to contain a point of inflection.

In other words, as the optical system of variable magnification power moves from the wide angle to the telephoto position, the refractive power of the component B is controlled under the following condition:

$$\frac{|\phi M| - |\phi W|}{|\phi M| - |\phi T|} > 0$$

where $\phi W$, $\phi M$ and $\phi T$ are the values of the refractive power of said component B for the wide angle, middle and telephoto positions respectively.

The following is still another embodiment of the invention, where one and the same component A of continuously variable refractive power is also made axially movable to maintain the position of the image plane of the entire system constant.

For the purpose of clarity, the number of components constituting an optical system of variable magnification power is limited to two. From front to rear, a first component having a refractive power $\phi 1$ and a second component having a refractive power $\phi 2$ are spaced from each other by an interval E between their principal points. The following is an equation for the required amount of variation of the refractive power of the second component to maintain the position of the image plane of the entire system constant in terms of a distance, t, by which the same or second component is moved to vary the focal length of the entire system:

$$\phi t = \frac{1}{SK - t} - \frac{\phi 1}{1 - (E + t)\phi 1}$$

where $SK = \dfrac{1 - E\phi 1}{\phi 1 + (1 - E\phi 1)\phi 2}$.

For a given power distribution over the optical system in an initial state at $\phi 1 = -1/50$, $\phi 2 = 1/35$ and $E = 35$, when the second component moves forward, this equation gives the numerical data in accordance with which a specific example 5 can be constructed as listed in Table 5 below.

TABLE 5

| (Numerical Example 5) | | | |
|---|---|---|---|
| Overall Focal Length | t | E | $\phi t$ |
| 35 | 0 | 35 | 0.02857 |
| 40.313 | −5 | 30 | 0.02800 |
| 46.333 | −10 | 25 | 0.02772 |
| 53.214 | −15 | 20 | 0.02771 |
| 61.154 | −20 | 15 | 0.02796 |
| 70.417 | −25 | 10 | 0.02850 |

Figure 5:
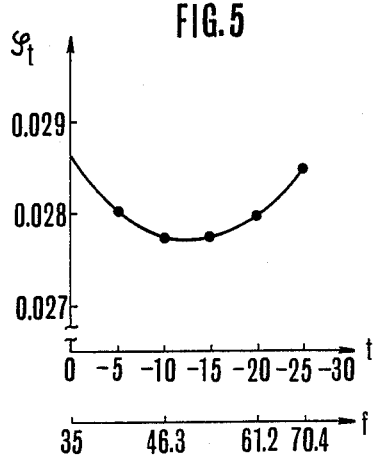
Figure 5B:
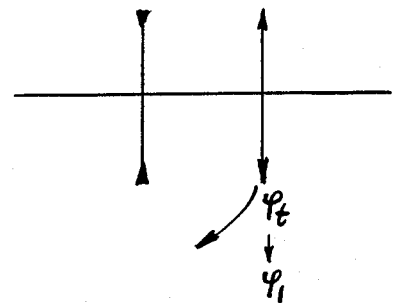

As is obvious from Table 5, the use of the second component of continuously variable refractive power arranged to move 25 mm axially provides a zoom lens system of a range from 35 mm to 70.417 mm. The numerical data of Table 5 are plotted in coordinates in FIG. 5 to illustrate the different feature of specific example 5 to that of the preceding ones. FIG. 5(B) illustrates the refractive power distribution of the lens in FIG. 5.

The following discussion is directed to a four-component zoom lens system with first, second, third and fourth components counting from the front having refractive powers $\phi 1$, $\phi 2$, $\phi 3$ and $\phi 4$ with their principal points at respective intervals E1, E2 and E3. The first to the third components are assumed to form an afocal system. The second component is selected for employment as both of the variator and compensator. Then we have an equation for the required value of the refractive power of the second component to maintain a constant position for the image plane in terms of a distance, t, by which the second component moves axially to vary the focal length of the entire system as follows:

$$\phi t = \frac{1}{E2 - t - \dfrac{1}{\phi 3}} - \frac{\phi 1}{H2}$$

where $H2 = 1 - (E1 + t) \cdot \phi 1$

For a given power distribution over the optical system in an initial state at $\phi 1 = 1/110$, $\phi 2 = -1/35$, $\phi 3 = 1/95.702$, $\phi 4 = 1/113.973$, $E1 = 9.5$, $E2 = 42$ and $E3 = 10$, this equation gives the numerical data in accordance with which a specific example 6 may be constructed as listed in relation with the discrete values of the focal length of the entire system in Table 6 below.

TABLE 6

| (Numerical Example 6) | | | | |
|---|---|---|---|---|
| Overall Focal Length | t | E1 | E2 | $\phi t$ |
| 70 | 0 | 9.5 | 42 | −0.02857 |
| 92.210 | 10 | 19.5 | 32 | −0.02675 |
| 105.263 | 15 | 24.5 | 27 | −0.02625 |
| 119.938 | 20 | 29.5 | 22 | −0.02599 |
| 136.556 | 25 | 34.5 | 17 | −0.02595 |
| 155.532 | 30 | 39.5 | 12 | −0.02613 |
| 177.405 | 35 | 44.5 | 7 | −0.02654 |
| 202.893 | 40 | 49.5 | 2 | −0.02720 |

Figure 6:
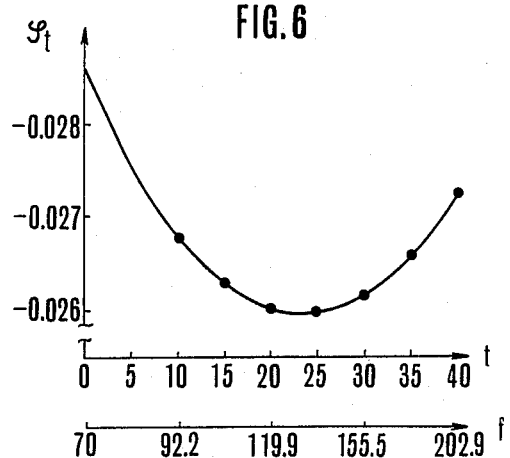
Figure 6B:
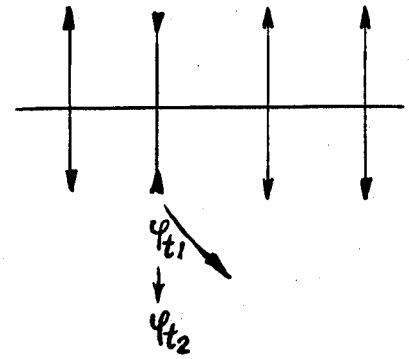

As is obvious from Table 6, the use of one component of continuously variable refractive power arranged to move 40 mm axially provides a 4-component zoom lens system of a range from 70 to 202.893 mm. The data of Table 6 are plotted in coordinates in FIG. 6 to illustrate how to vary the refractive power and position of the second component with the focal length of the entire system. FIG. 6(B) illustrates the refractive power distribution of the lens in FIG. 6.

It will be appreciated that while the prior art zoom lens system necessitates at least two axially movable components, it is in the present invention that only one axially movable component suffices for performing both of the functions of varying the focal length of the entire system and of compensating for the image shift.

It should be pointed out that in designing an optical system of variable magnification power in an equivalent range, it is rather preferable to provide means for making the required range of variation of the refractive power of that component as narrow as possible, thereby offering, for example, the advantage that variation of the radius of curvature of the lens surface or of the refractive power of the material within the interior of the lens component can be easily controlled. This leads one to choose the range of variation of the refractive power of that component so as to contain a point of inflection. In other words, as the optical system of variable magnification power is zoomed from the wide angle to the telephoto position, letting $\phi W$ denote the refractive power of the aforesaid component A in the wide angle position, $\phi T$ the refractive power in the telephoto position, and $\phi M$ the refractive power in a middle zooming position therebetween, the refractive power of the component A is made to vary so as to satisfy the following inequality $$\frac{|\phi M| - |\phi W|}{|\phi M| - |\phi T|} > 0$$

It is also possible to otherwise fulfill such requirement by varying the refractive power of that component from a negative to a positive value, or vice versa to increase the varifocal effect.

Of the methods for varying the refractive power of a lens element, there is one in which the lens element is made up of transparent elastic material in the form of a hollow core which is later filled with a liquid or gas of different refractive index from that of air. Under control of conditions of this core liquid or gas, the radius of curvature of the lens surface is varied. Another method is to utilize Kerr effect in varying the refractive index of the glass.

As has been described in greater detail above, the present invention, as compared with a prior art mechanically compensated type zoom lens system which necessitates at least two axially movable component as a rule, makes it possible to achieve an optical system of variable magnification power in far more compact a form thanks to all the components being held stationary throughout the focal length range, or if desired, to the use of only one movable component.

Though the present invention has been described in connection with the 2- and 4-component optical systems, the principles of the present invention are applicable to other types of zoom lens systems.

While the present invention has been particularly shown and described with reference to preferred embodiments thereof, various modifications in form and details may be made. For example, the duty of varying the refractive power is borne by two or more components for compensating for the image shift. This affords the advantage that the required amount of variation of the refractive power of the individual one component is reduced to a half, one-third or so on as large for which the image shift compensation can be easily fulfilled.

Another modification is that a component of continuously variable refractive power may be used as the focusing lens. Since, in this case, focusing can be carried out without having to move the focusing lens, a further advance in the compactness of the zoom lens can be achieved.

What I claim:

1. An optical system of variable magnification power comprising, from an object side to an image side:
   a first lens component of variable refractive power from a negative power to a positive power; and
   a second lens component of variable refractive power from a positive power to a negative power, wherein an image is maintained at a predetermined place.

2. A compact zoom lens comprising:
   a first lens component which has a negative refractive power and, at the same time, has its refractive power made variable; and
   a second lens component which has a positive refractive power and, at the same time, has its refractive power made variable;
   wherein the refractive powers of said first and second components are varied simultaneously for varying the magnification power and, at the same time, an image surface of that total system is maintained at a constant position.

3. A compact zoom lens according to claim 2, and further comprising:
   a front lens component located on the object side of said first lens component, and having a positive refractive power, and
   a rear lens component located on the image side of said second lens component and having a positive refractive power.

4. A compact zoom lens comprising:
   a first lens component having a positive refractive power;
   a second lens component with a variable refractive power;
   a third lens component with a variable refractive power;
   said lens components being positioned in said order from an object side;
   wherein along with the variation of a magnification power of the zoon lens from the wide angle end to the telephoto end, said second lens component varies its refractive power from negative to positive, and said third lens component varies its refractive power from positive to negative, said variable components acting to maintain an image at a predetermined place.

5. A compact zoom lens according to claim 4, wherein said first, second and third lens components constitute an afocal optical system.

6. A zoom lens comprising:
   a negative lens component having a variable negative refractive power; and
   a positive lens component having a positive refractive power,
   said refractive power of said negative lens component being changeable and said positive lens component being shiftable along an optical axis so as to effect magnification variation while an image plane is maintained at a predetermined place.

7. A zoom lens according to claim 6, and further comprising:
   a front lens component located on the object side of said negative lens component, and
   a rear lens component located on the image side of said positive lens component.

8. A zoom lens according to claim 6, wherein said positive lens component shifts to the object side during magnification variation from a wide angle position to a telephoto position.

9. A zoom lens comprising:
   a positive lens component having a positive refractive power; and
   a negative lens component having a negative refractive power, at least one of said positive lens component and said negative lens component being changeable in refractive power and the other of said positive and negative lens components being shiftable along an optical axis so as to effect magnification variation while an image plane is maintained at a predetermined place.

10. A zoom lens according to claim 9, wherein said refractive power of said negative lens component is changeable and said positive lens component is shiftable along the optical axis to effect zooming.

11. A zoom lens according to claim 9, comprisng from the object side:
    a front lens component having a positive refractive power,
    the negative lens component,
    the positive lens component, and
    a rear lens component having a positive refractive power.

12. A zoom lens accoding to claim 10 or 11, wherein said negative lens component shifts to the object side during zooming from a wide angle position to a telephoto position.

13. A zoom lens according to claim 9, wherein the refractive power of said positive lens component is changeable and said negative lens component is shiftable along the optical axis to perform zooming.

14. A zoom lens according to claim 13, satisfying the following condition:

$$\frac{|\phi M| - |\phi W|}{|\phi M| - |\phi T|} > 0$$

wherein $\phi M$ and $\phi T$ represent the refractive power of said positive lens component respectively at the wide angle position and the telephoto position, and $\phi M$ represents the refractive power of said positive lens component at a zooming position between the wide angle and telephoto positions.

15. A zoom lens according to claim 13, wherein said negative lens component is shifted to the image side during zooming from the wide angle position to the telephoto position.

16. A zoom lens comprising:
a negative lens component having a negative refractive power; and
a positive lens component having a positive refractive power,
at least one of said negative and positive lens components being changeable in refractive power and shiftable along an optical axis so as to effect magnification variation while an image plane is maintained at a predetermined place.

17. A zoom lens according to claim 16, wherein said negative lens component and said positive lens component are arranged in an order from the object side, and the refractive power of said positive lens component is changeable and said positive lens component is shiftable along the optical axis to the object side during zooming from the wide angle position to the telephoto position.

18. A zoom lens according to claim 16, comprising in order from the object side:
a positive lens component having a positive refractive power,
the negative lens component,
the positive lens component, and
a rear lens component.

19. A zoom lens according to claim 16, satisfying the following condition:

$$\frac{|\phi M| - |\phi W|}{|\phi M| - |\phi T|} > 0$$

wherein $\phi W$ and $\phi T$ represent the refractive power of said positive lens component respectively at the wide angle position and the telephoto position, and $\phi M$ represents the refractive power of said positive lens component at a zooming position between the wide angle and telephoto positions.

20. A compact zoom lens comprising:
a first lens component having a negative refractive power and, at the same time, moving on the optical axis for effecting a variation of magnification power of the total system; and
a second lens component having a positive refractive power and, at the same time, having its refractive power varied for maintaining an image surface of the total system at a constant position;
wherein, along with a variation of magnification power of said zoom lens from the wide angle end to the telephoto end, the following condition is satisfied:

$$\frac{|\phi M| - |\phi W|}{|\phi M| - |\phi T|} > 0$$

wherein $\phi W$ denotes the refractive power of said first lens component at the wide angle end, $\phi T$ denotes the refractive power at the telephoto end, and $\phi M$ denotes the refractive power at a zooming position therebetween.

21. A compact zoom lens according to claim 20, wherein said first lens component moves to an image side when a zooming is made from the wide angle end to the telephoto end.

22. A compact zoom lens according to claim 20, and further comprising:
a front lens component located on the object side of said first lens component and having a positive refractive power, and a rear lens component located on the image side of said second lens component and having a positive refractive power.

23. A compact zoom lens comprising:
a first lens component having a negative refractive power; and
a second lens component which has a positive refractive power and, for a purpose of varying a magnification power of the zoom lens, has its refractive power varied and, at the same time, moves on the optical axis;
wherein an image plane is retained at a constant position, and, along with a variation of the magnification power of said zoom lens from the wide angle end to the telephoto end, the following condition is satisfied:

$$\frac{|\phi M| - |\phi W|}{|\phi M| - |\phi T|} > 0$$

wherein $\phi W$ denotes the refractive power of said second lens component at the wide angle end, $\phi T$ denotes the refractive power at the telephoto end, and $\phi M$ denotes the refractive power at a zooming position therebetween.

24. A compact zoom lens according to claim 23, wherein said second lens component moves to an object side when a zooming is made from the wide angle end to the telephoto end.

25. A compact zoom lens comprising:
a first lens component which has a negative refractive power and, for a purpose of effecting a variation of the magnification power while maintaining an image plane at a constant position, has its refractive power varied and, at the same time, moves on the optical axis; and
a second lens component having a positive refractive power;
wherein, along with a variation of the magnification power of said zoom lens from the wide angle end to the telephoto end, the following condition is satisfied:

$$\frac{|\phi M| - |\phi/W|}{|\phi M| - |\phi T|} > 0$$

wherein φW denotes the refractive power of said first lens component at the wide angle end, φT denotes the refractive power at the telephoto end, and φM denotes the refractive power at a zooming position therebetween.

26. A compact zoom lens according to claim 25, wherein said first lens component moves to an image side when a zooming is made from the wide angle end to the telephoto end.

27. A compact zoom lens according to claim 25, and further comprising:
 a front lens component located on the object side of said first lens component, and
 a rear lens component located on the image side of said second lens component.

* * * * *